United States Patent
Nakaoka et al.

(12) 
(10) Patent No.: US 6,230,277 B1
(45) Date of Patent: May 8, 2001

(54) PERIPHERAL DEVICE FOR REDUCING POWER SUPPLIED FROM A HOST DEVICE AND CONTROL METHOD THEREOF

(75) Inventors: Hiroyuki Nakaoka, Tenri; Yoshihiro Otani, Soraku-gun; Hiroshi Uno, Nara, all of (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/539,713

(22) Filed: Mar. 31, 2000

(30) Foreign Application Priority Data

Mar. 31, 1999 (JP) .................................................. 11-090525

(51) Int. Cl.$^7$ ...................................................... G06F 1/26
(52) U.S. Cl. .......................... 713/320; 713/310; 713/322; 713/323; 713/324
(58) Field of Search ..................................... 713/300–340

(56) References Cited

U.S. PATENT DOCUMENTS

| | | | |
|---|---|---|---|
| 5,404,544 | * | 4/1995 | Crayford . |
| 5,706,110 | * | 1/1998 | Nykanen ............................ 359/110 |
| 5,987,338 | * | 11/1999 | Gibbons et al. .................... 455/574 |
| 5,987,339 | * | 11/1999 | Asano ................................ 455/574 |
| 6,038,612 | * | 3/2000 | Liow ..................................... 710/1 |

* cited by examiner

*Primary Examiner*—Ario Etienne (57) ABSTRACT

A peripheral device operating with power supplied from a host device includes a receive unit receiving an external signal and a controller. The controller causes at least one of the functions of the peripheral device to operate intermittently when the host device is in a sleep mode. Further, upon reception of the external signal via the receive unit, the controller forces the host device to shift to an active mode based on the signal received. As at least one of the functions of the peripheral device is forced to operate intermittently when the host device is in the sleep mode, the consumption of the power supplied from the host device is reduced.

11 Claims, 7 Drawing Sheets

PERIPHERAL DEVICE FOR REDUCING POWER SUPPLIED FROM A HOST DEVICE AND CONTROL METHOD THEREOF

BACKGROUND OF THE INVENTION

1. Field of the Invention

The present invention relates to reduced power consumption in home appliances and information devices having communication functions, and more particularly, to a peripheral device consuming less power with a part of its functions being operated intermittently, and a control method thereof.

2. Description of the Background Art

Infrared communication is often used as means of connecting control devices such as remote controllers and keyboards with controlled devices, in order to remotely control the home appliances and information devices, as well as to alleviate inconvenience of a wired connection.

Normally, the remote control devices such as remote controllers not only control the functions being provided while the controlled devices are in operation, including channel change, volume control, and command input, but also control switching on/off of the controlled devices.

If the controlled device is a home appliance, an infrared receive unit is normally incorporated therein in advance. However, information devices are often designed for general purposes.

IrDA Control is a system standardized by the Infrared Data Association (IrDA), a U.S.-based infrared communication standardizing organization, for remote control of home appliances and information devices, or for two way information exchanges. The IrDA Control system is controlled by the Universal Serial Bus (USB) system for versatility and ease of design when connected to or incorporated in an information device.

Figure 1:
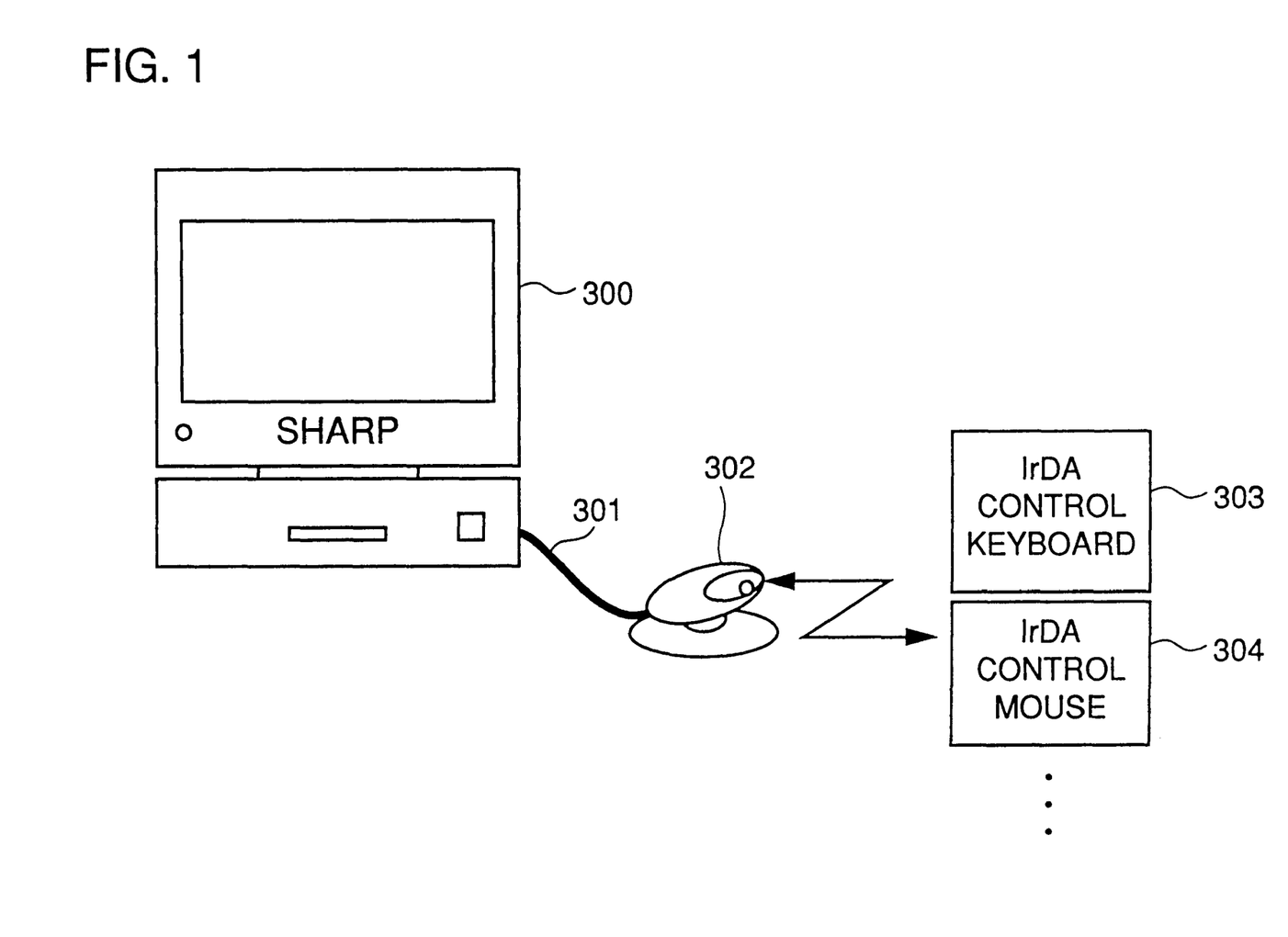
FIG. 1 illustrates connection between a personal computer incorporating a USB host controller and an IrDA Control Dangle.

FIG. 1 illustrates connection between a PC incorporating a USB host controller and an external IrDA Control peripheral device (hereinafter, referred to as an "IrDA Control Dangle").

The USB host controller-contained PC 300 and the IrDA Control Dangle 302 are connected by a USB cable 301. The user can control PC 300 by an IrDA Control keyboard 303 or an IrDA Control mouse 304 which is connected to IrDA Control Dangle 302 by infrared rays.

Recently, a controlled information device, such as a personal computer, is designed to enter a sleep mode or a power OFF mode automatically or by the order of a user if it is not used for a long time period, to save power consumption.

However, even when the personal computer is in the sleep mode, the IrDA Control Dangle incorporated in, or connected via a USB cable to, the information device is designed to constantly function. Thus it is possible to recover the PC from its sleep mode by manipulating the IrDA Control keyboard, mouse or the like.

There are two possible ways to supply power to the IrDA Control Dangle. One is to directly supply power from the outside via an AC adapter or the like. The other is to supply power via the USB cable.

According to the USB Physical Layer Specification (Revision 1.1), a current up to 500 mA is supplied to a peripheral device through the USB cable when the USB host controller is in operation. Supplying the power through the USB is preferable because it is more convenient as the user does not need to ensure external power supply every time.

When the USB is in a sleep mode, however, the supply current of the USB is reduced to an average of 2.5 mA per second to save power consumption (the maximum standby current is permitted up to 100 mA if within 1 $\mu$s). Therefore, there arises a problem that an IrDA Control Dangle consuming the current of greater than 2.5 mA cannot be made to function when the PC is in the sleep mode.

SUMMARY OF THE INVENTION

An object of the present invention is to provide a peripheral device consuming less power supplied from a host device, and a control method thereof.

Another object of the present invention is to provide a peripheral device capable of fulfilling the USB physical layer specification even when the host device is in a sleep mode, and a control method thereof.

A still further object of the present invention is to provide a peripheral device improved in operability of a user, and a control method thereof.

According to an aspect of the present invention, a peripheral device operating with power supplied from a host device includes: a receive unit receiving an external signal; and a controller causing at least a part of functions of the peripheral device to operate intermittently when the host device is in a sleep mode, and, upon reception of the external signal via the receive unit, forcing the host device to shift to an active mode according to the signal received.

At least a part of the functions of the peripheral device is forced by the controller to operate intermittently while the host device is in the sleep mode. Thus, it is possible to reduce consumption of the power supplied from the host device. Further, by adjusting the time ratio between the active mode and the sleep mode during the intermittent operation, it is possible to fulfill the USB physical layer specification. Moreover, by setting the period of the active mode during the intermittent operation to be as long as possible, the detection of the external signal becomes easier, whereby the operability of the user is improved.

According to another aspect of the present invention, a control method of the peripheral device operating with the power supplied from the host device includes the steps of: causing at least a part of functions of the peripheral device to operate intermittently when the host device is in a sleep mode; receiving an external signal; and forcing the host device to shift to an active mode according to the external signal received.

When the host device is in the sleep mode, at least a part of the functions of the peripheral device operates intermittently. This reduces consumption of the power supplied from the host device. Further, by adjusting the time ratio between the active mode and the sleep mode during the intermittent operation, it is possible to fulfill the USB physical layer specification. Moreover, by setting the period of the active mode during the intermittent operation to be as long as possible, the detection of the external signal becomes easier, and thus, the operability of the user is improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Configuration of the controller of IrDA Control

Figure 2:
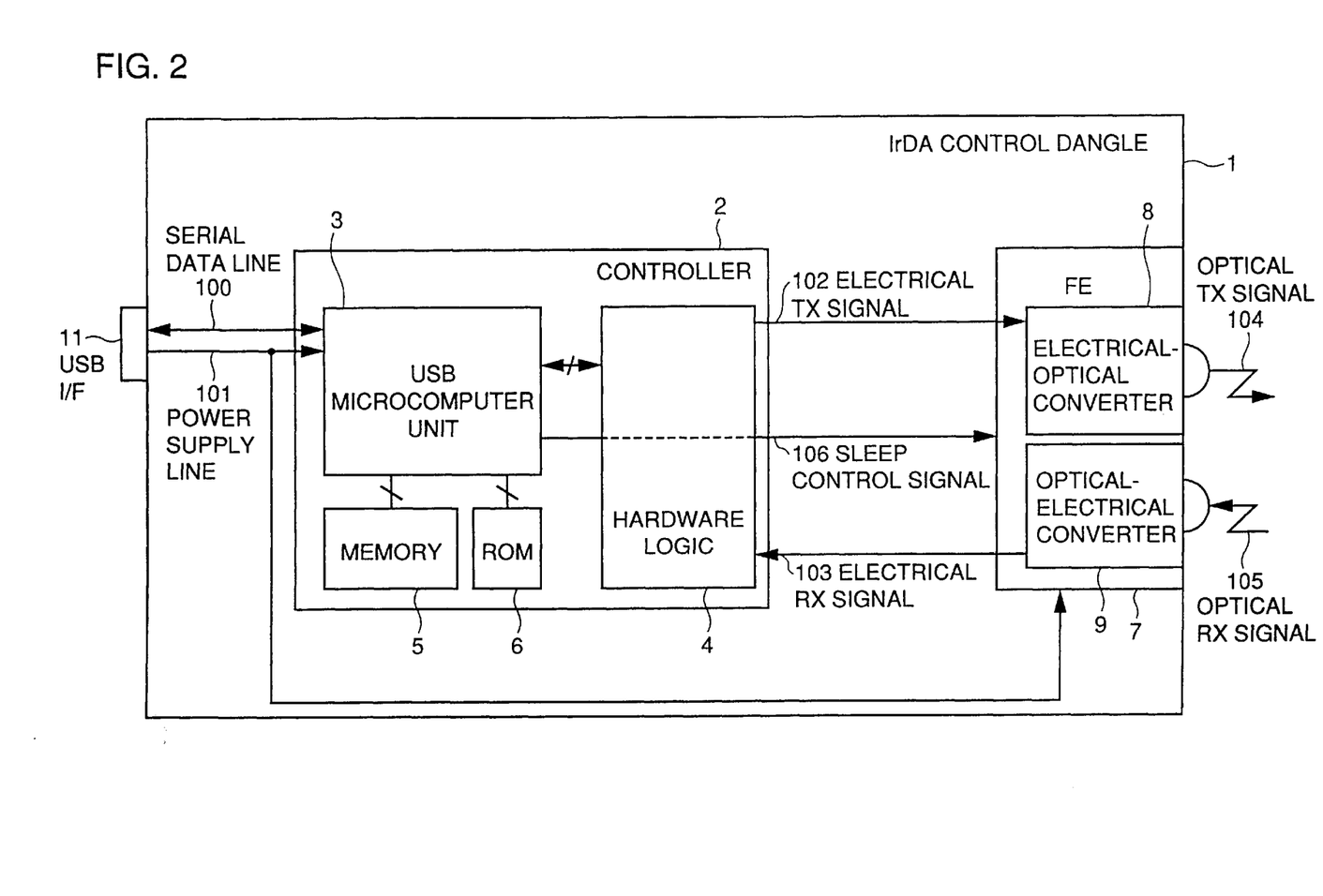
FIG. 2 is a block diagram showing a schematic configuration of the IrDA Control Dangle according to a first embodiment of the present invention.

Generally, an infrared communication device, such as an IrDA Control Dangle 1, is formed of: a front end (FE) 7 including an analog circuit for conversion between an electrical signal and an optical signal, which is also called an infrared transceiver; a controller 2 performing control of modulation/demodulation and communication; and a USB interface (I/F) 11, as shown in FIG. 2. Power is supplied to IrDA Control Dangle 1 via a power supply line 101. Data input/output between USB I/F 11 and controller 2 is performed via a serial data line 100.

In the case of IrDA Control Dangle 1, controller 2 includes: a hardware logic 4 controlling FE 7; a USB microcomputer unit 3 controlling hardware logic 4; a memory 5; and a read only memory (ROM) 6. FE 7 includes: an electrical-optical converter 8 converting an electrical transmit (tx) signal 102 to an optical tx signal 104; and an optical-electrical converter 9 converting an optical receive (rx) signal 105 to an electrical rx signal 103.

Figure 3:
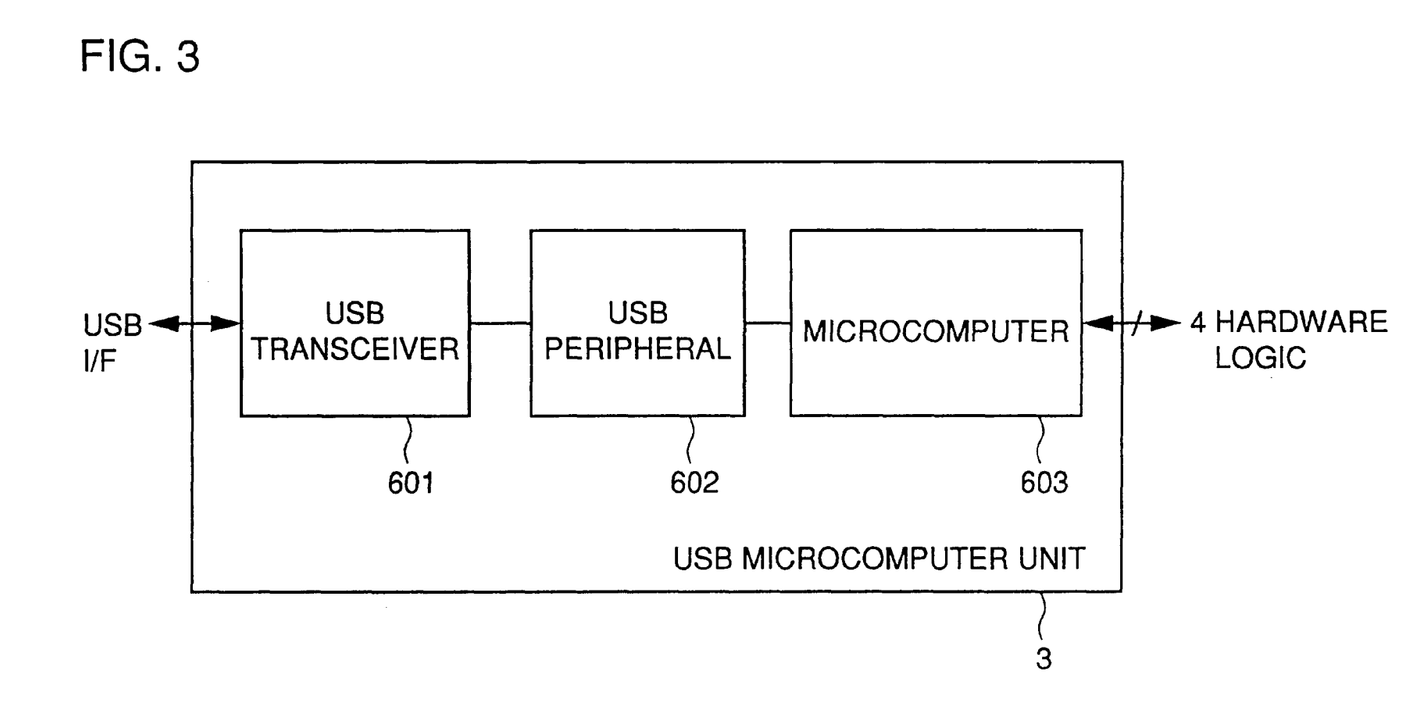
FIG. 3 is a block diagram showing a schematic configuration of the USB microcomputer unit 3.

FIG. 3 shows a configuration of USB microcomputer unit 3. USB microcomputer unit 3 includes: a USB transceiver 601; a USB peripheral 602; and a microcomputer 603.

USB transceiver 601 communicates with USB I/F 11. USB peripheral 602 controls USB transceiver 601. Microcomputer 603 controls hardware logic 4 and USB peripheral 602, and also analyzes data.

In such a configuration, the component which generally consumes power the most is FE 7, which is followed by hardware logic 4 and microcomputer 603 within controller 2.

Here, for simplicity, current consumption only by these three circuits will be considered.

Assuming that FE 7, hardware logic 4 (upon reception) and microcomputer unit 3 in the active mode consume currents of 5 mA, 1 mA and 2 mA, respectively, IrDA Control Dangle 1 as a whole consumes a current of 8 mA.

Intermittent Operation Cycle

Figure 4:
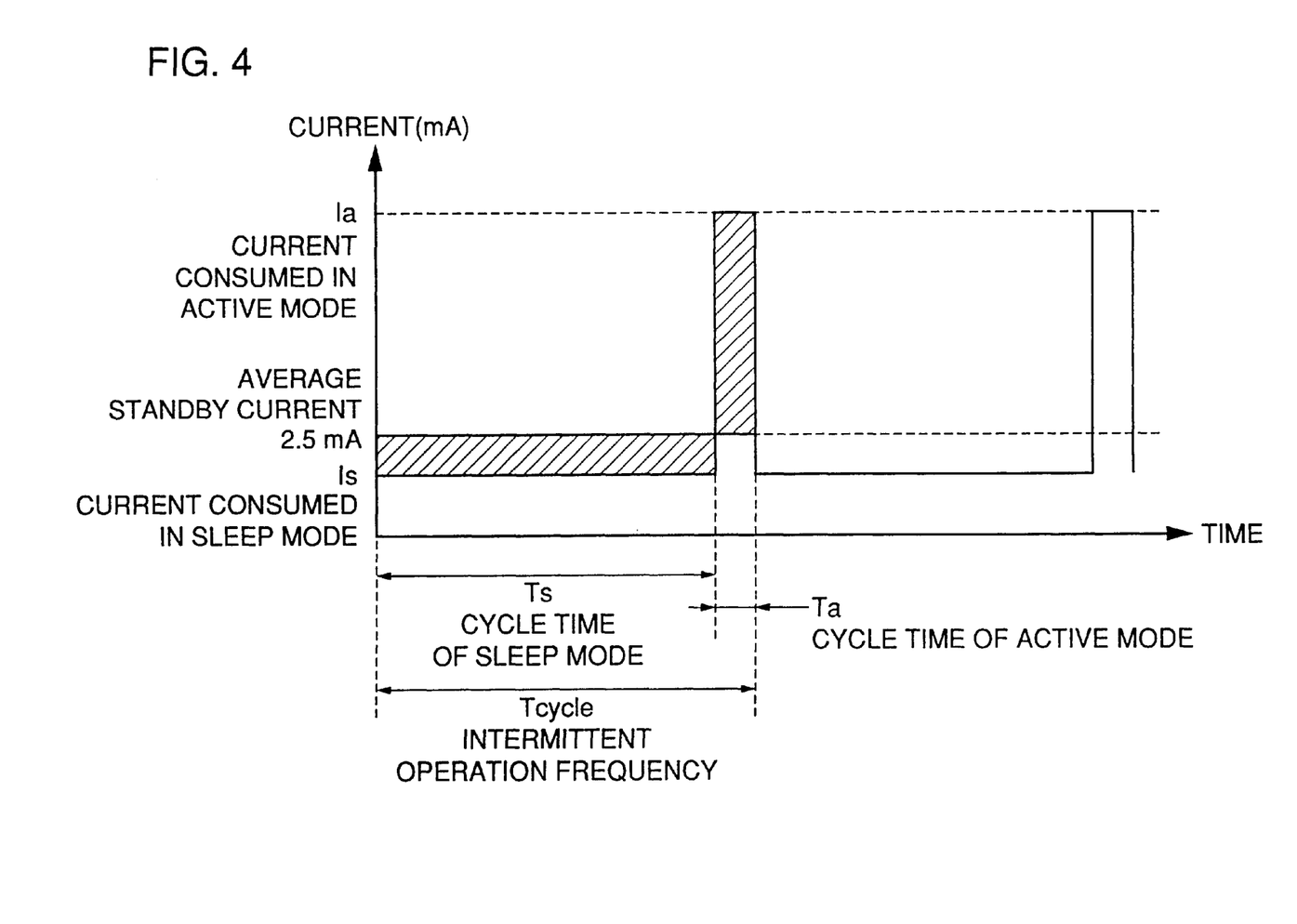
FIG. 4 illustrates changes in the amount of current consumption during the intermittent operation of the IrDA Control Dangle according to the first embodiment.

FIG. 4 illustrates changes in the current consumed amount in IrDA Control Dangle 1 during the intermittent operation.

To maintain the average current consumed amount of not greater than 2.5 mA per second, it is necessary to adjust each cycle time such that the shaded area representing the current amount saved in a cycle time Ts of the sleep mode becomes equivalent to or greater than the shaded area representing the current amount consumed in a cycle time Ta of the active mode. Specifically, the following expression should be satisfied:

$$Ta \times (Ia - 2.5\ mA) \leq Ts \times (2.5\ mA - Is) \quad (1)$$

wherein Ia is a current consumed in the active mode, and Is is a current consumed in the sleep mode.

As an average standby current of the USB is defined as a frequency per second, the intermittent operation cycle in the present embodiment is also set as 1 second. Thus, cycle time Ts of the sleep mode is expressed as follows:

$$Ts = 1(s) - Ta \quad (2)$$

By substituting expression (2) for expression (1), we have $$Ta \leq (2.5\ mA - Is) \div (Ia - Is) \quad (3)$$

In the present embodiment, the current value in the active mode is already set. Thus, if the current value in the sleep mode is obtained from expression (3), the upper limit of the cycle time of the active mode can be calculated. When the cycle time of the active mode is determined, the cycle time of the sleep mode can also be determined by expression (2).

In the present embodiment, only USB microcomputer unit 3 is constantly held in operation, and microcomputer 603 controls active/sleep modes of hardware logic 4 and FE 7 at a prescribed frequency.

Specifically, microcomputer 603 controls the active/sleep modes by controlling clock supply to each circuit in controller 2.

For FE 7, microcomputer 603 controls the modes by a sleep control signal 106. When sleep control signal 106 is at a high (H) level, FE 7 attains the sleep mode. When signal 106 is at a low (L) level, FE 7 attains an active mode.

IrDA Control Dangle 1 consumes a current of 8 mA when all the circuits therein are active, while microcomputer 603 consumes a current of 2 mA. Thus, from expression (3), we have $$Ta \leq 83\ ms$$

Here, when cycle time Ta of the active mode is assumed to be 80 ms, cycle time Ts of the sleep mode is 920 ms according to expression (2).

Microcomputer 603 sets FE 7 and controller 2 in the sleep mode by driving sleep control signal 106 to the H level and, at the same time, cutting the clock supply to the circuits within controller 2 other than microcomputer 603. After 920 ms has passed in the sleep mode, microcomputer 603 sets FE 7 and controller 2 in the active mode by driving sleep control signal 106 to the L level and, at the same time, restarting the clock supply to each circuit within controller 2. After 80 ms, it sets FE 7 and controller 2 in the sleep mode again, and thereafter, repeats this cycle until an infrared signal is received, or until the USB host controller attains an active mode.

When FE 7 receives optical rx signal 105 from the outside while IrDA Control Dangle 1 is in the active mode, optical-electrical converter 9 converts the signal 105 to electrical rx signal 103, which is analyzed by hardware logic 4.

Hardware logic 4 notifies USB microcomputer unit 3 only when electrical rx signal 103 is a signal for the IrDA Control Dangle. When reported, USB microcomputer unit 3 activates the host device via the USB.

After the activation of the host device, IrDA Control Dangle 1 stops its intermittent operation and reenters the active mode.

As explained above, IrDA Control Dangle 1 according to the present embodiment causes the circuits other than USB microcomputer unit 3 to operate intermittently while the USB host controller is in the sleep mode. Thus, it is possible to reduce the power consumption of IrDA Control Dangle 1 as a whole, and to fulfill the USB physical layer specification.

The detection of externally supplied optical rx signal 105 is possible only when IrDA Control Dangle 1 is in the active mode, as described above.

Therefore, the user should manipulate the IrDA Control keyboard or mouse many times until the timing matches.

Second Embodiment

Figure 5:
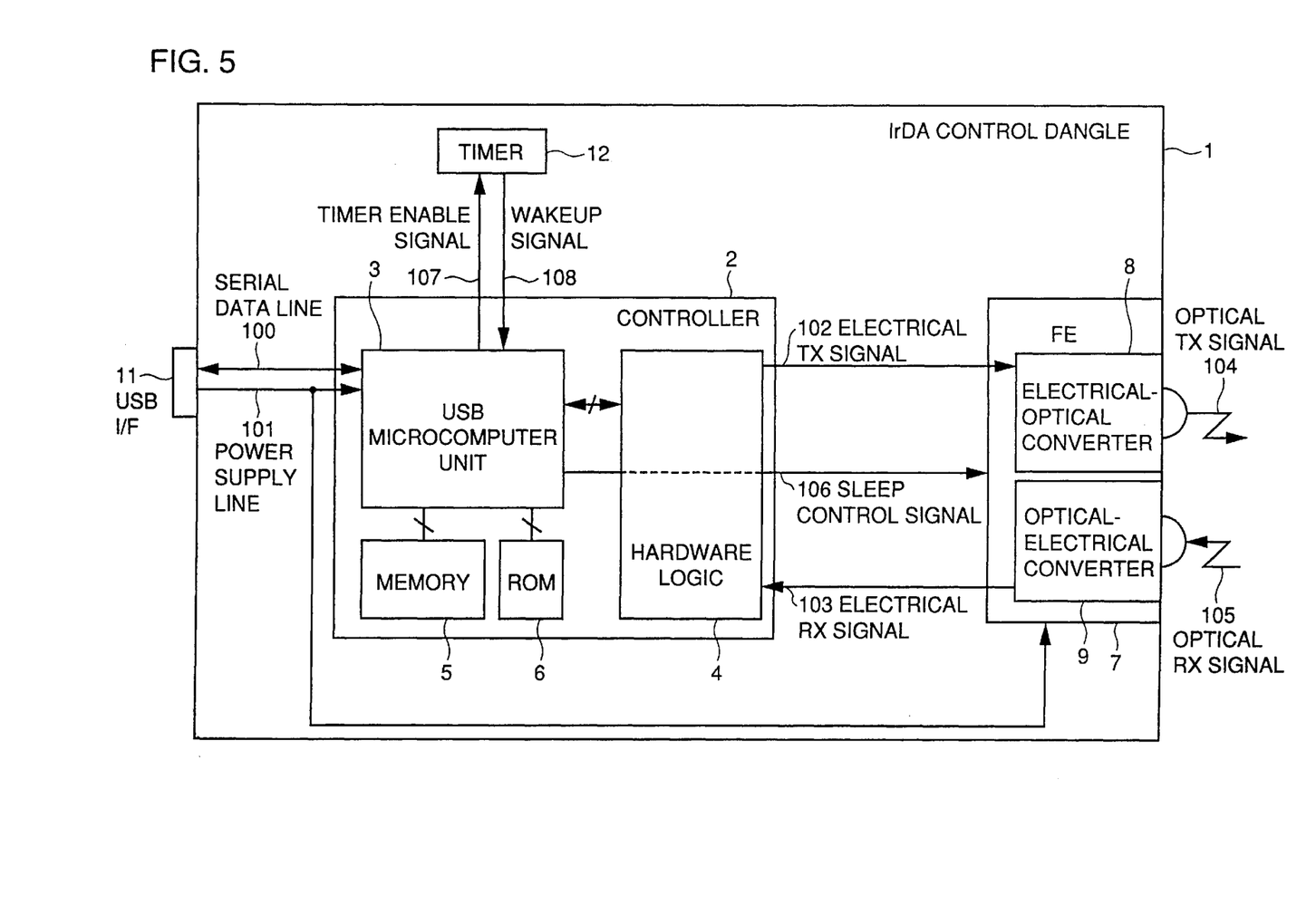
FIG. 5 is a block diagram showing a schematic configuration of the IrDA Control Dangle according to a second embodiment of the present invention.

FIG. 5 shows a circuit configuration according to the second embodiment.

In the second embodiment, IrDA Control Dangle 1 as in the first embodiment is additionally provided with a timer 12, which consumes less power than microcomputer 603. This timer 12 controls the recovery of IrDA Control Dangle 1 from the sleep mode, so that microcomputer 603 is also made to enter the sleep mode.

When entering the sleep mode, microcomputer 603 drives a timer enable signal 107 to an H level to set timer 12 effective.

After a prescribed time has passed, timer 12 drives a wakeup signal 108 to an H level to activate controller 2. In addition, hardware logic 4 causes FE 7 to enter an active mode.

When activated, microcomputer 603 immediately inactivates timer 12 by driving timer enable signal 107 to an L level. After a prescribed time has passed in the active mode, it activates the timer again, and reenters the sleep mode.

When IrDA Control Dangle 1 is in the sleep mode, FE 7, hardware logic 4 and microcomputer 603 are also in the sleep mode. Therefore, very few amount of current is consumed. Here, for simplicity, the current value of IrDA Control Dangle 1 in its sleep mode is assumed to be 0 ampere (A).

By substituting this current value in the sleep mode for expression (3), we have cycle time Ta of the active mode as follows:

$$Ta \leq -312.5 \text{ ms}$$

In the present embodiment, cycle time Ta of the active mode is set to 300 ms.

This means that, according to this embodiment, it is possible to acquire the cycle time of the active mode more than three times as long as that in the first embodiment.

Therefore, the detection of the external signal by IrDA Control Dangle 1 becomes easier than in the first embodiment, whereby the operability of the user is improved.

Time Constant of Timer 12

Figure 6:
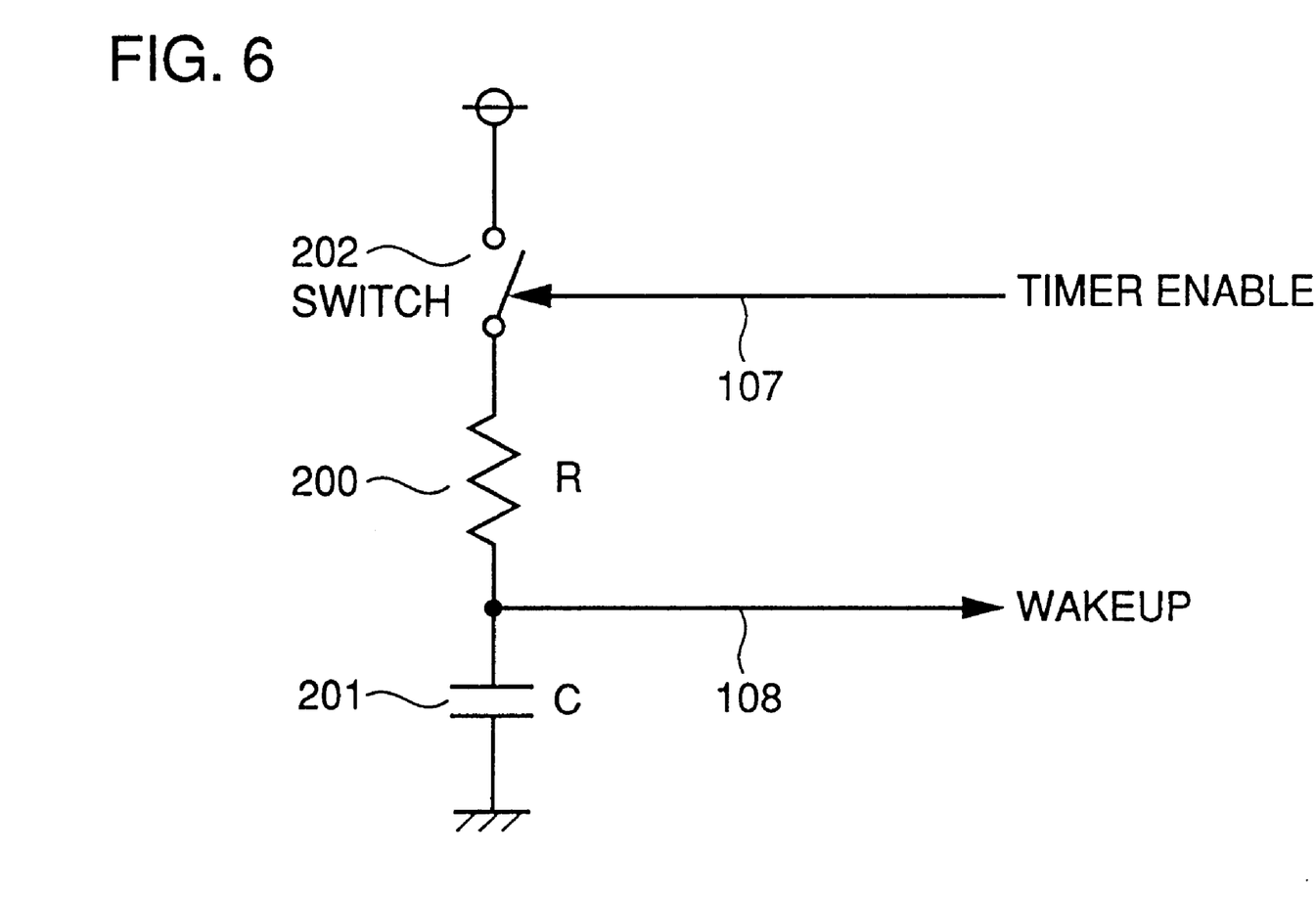
FIG. 6 shows a circuit configuration of the timer 12.

FIG. 6 shows a circuit configuration of timer 12 used in the present embodiment. Timer 12 includes a resistance 200, a capacitor 201 and a switch 202.

In the present embodiment, an RC low pass filter is used as the timer.

When timer enable signal 107 attains an H level, switch 202 is connected to a power supply. Wakeup signal 108 then rises to an H level with a time constant of the RC primary filter.

When timer enable signal 107 attains an L level, the switch is disconnected, and capacitor (C) 201 is discharged to return to the initial state.

The rise time T of the RC primary low pass filter can be calculated by the following expression:

$$T \approx 2.2 \, RC \quad (4)$$

Therefore, assuming that the rise time T of the low pass filter is 300 ms, we have the following from the reverse operation:

$$RC = 0.136$$

Suppose that the value of resistance (R) 200 is 100 K=. Then the value of C 201 becomes 1.36 $\mu$F.

As explained above, according to IrDA Control Dangle 1 of the present embodiment, USB microcomputer unit 3 also enters the sleep mode. Therefore, it is possible to make cycle time Ta of the active mode longer than in the first embodiment. The detection of the external signal thus becomes easier, and the operability of the user is improved.

Third Embodiment

Figure 7:
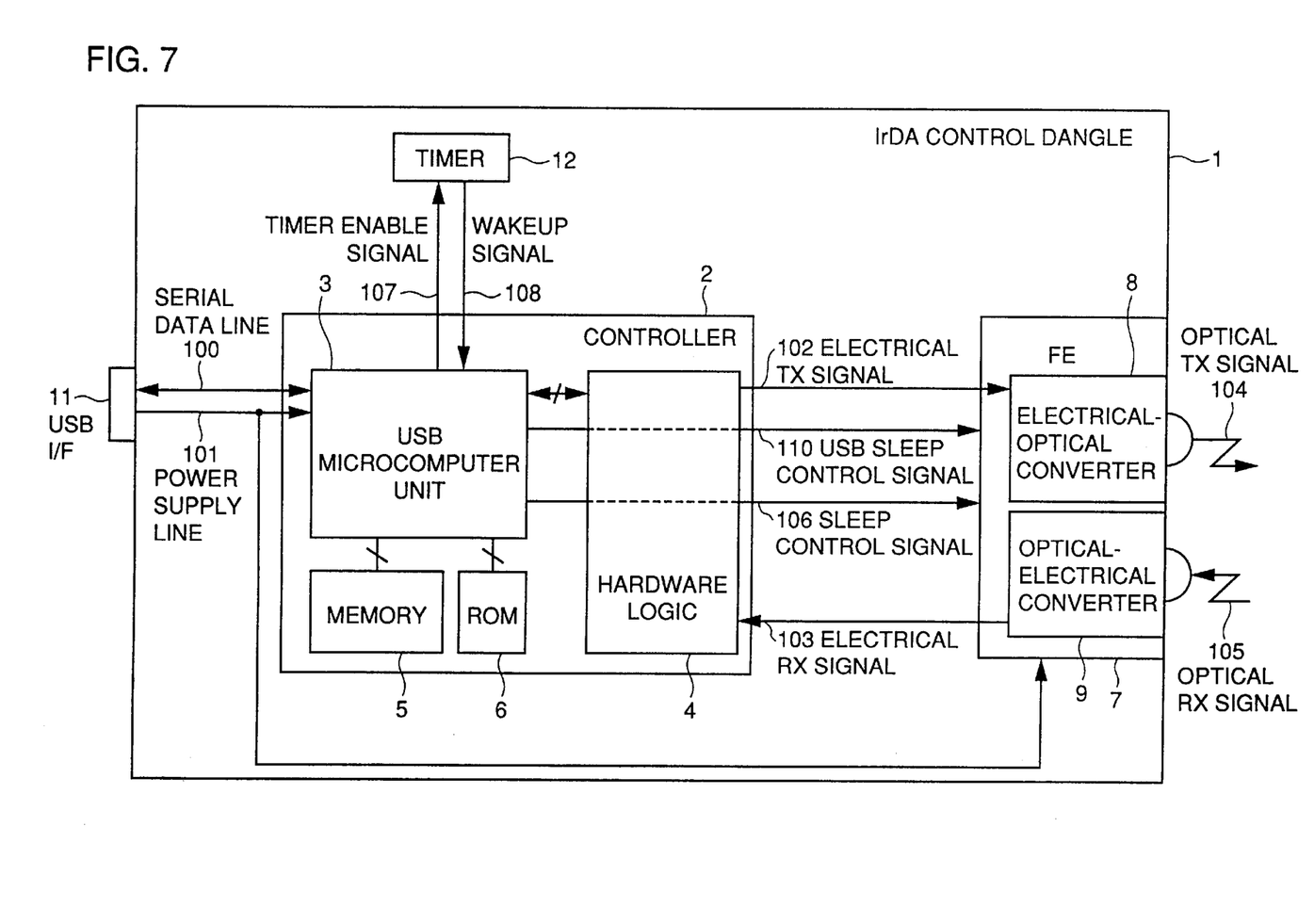
FIG. 7 is a block diagram showing a schematic configuration of the IrDA Control Dangle according to a third embodiment of the present invention.

FIG. 7 shows a circuit configuration of the third embodiment of the present invention.

In IrDA Control Dangle 1 of the present embodiment, electrical-optical converter 8 and optical-electrical converter 9 of FE 7, as in IrDA Control Dangle 1 of the first embodiment, are supplied with power independent of each other, and electrical-optical converter 8 is made to enter the sleep mode when the USB is in the sleep mode, such that the current consumption in the active mode is reduced.

The clock supply to a transmission-related circuit, or a transmit unit, within hardware logic 4 is also cut.

Such control is effected by a USB sleep control signal 110. Signal 110 notifies FE 7 and hardware logic 4 that the USB is in the sleep mode when it attains an H level, and that the USB is in the active mode when it attains an L level.

Assume that the current consumption of electrical-optical converter 8 in the active mode is 3 mA, and that of the transmit unit of hardware logic 4 is 0.5 mA. In this case, the current consumed by IrDA Control Dangle 1 in the active mode is 4.5 mA (i.e., 8 mA−3.5 mA).

Thus, from expression (3), we have $$Ta \leq 555.6 \text{ ms}$$

Here, if cycle time Ta of the active mode is set to 550 ms, it means that it is possible to obtain, according to this embodiment, the cycle time in the active mode that is more than 1.5 times as long as that in the second embodiment.

As explained above, according to IrDA Control Dangle 1 of the present embodiment, electrical-optical converter 8 and the transmit unit of hardware logic 4 are forced to enter the sleep mode even when IrDA Control Dangle 1 is in the active mode. Therefore, it is possible to elongate cycle time Ta in the active mode compared to the case of the first or second embodiment. The detection of the external signal thus becomes easier, so that the operability of the user is improved.

Fourth Embodiment

The first through third embodiments of IrDA Control Dangle 1 described above are applied to the case in which the current consumed by the peripheral device in the active mode is not greater than the maximum standby current (here, set at 100 mA) of the system. However, even if the current consumed by the peripheral device in the active mode exceeds the maximum standby current of the system, if a capacitor is disposed in the power supply unit of the peripheral device, it is possible to make the peripheral device function during the standby. In the present embodiment, the capacitor in the power supply unit is charged during the sleep mode of the intermittent operation. During the active mode, this capacitor supplies a current to cover the shortfall in the maximum standby current, and thus, the peripheral device can be made to operate.

Combining the configuration of the present embodiment with the configuration of the second or third embodiment, it becomes possible to further elongate the cycle time of the active mode.

As explained above, according to the IrDA Control Dangle of the present embodiment, a capacitor is disposed in the power supply unit. This allows the IrDA Control Dangle to operate even when it consumes a current in the active mode that is greater than the maximum standby current of the system.

Fifth Embodiment

The first through third embodiments are applied to the case where the FE and the hardware logic are both operated intermittently. In the present embodiment, only the FE, or both the FE and the hardware logic, are constantly held in an active mode if the current consumed by the FE, or by both the FE and the hardware logic, in the active mode is much less than an average standby current.

If only the FE is maintained in the active mode, the IrDA Control Dangle attains an active mode when the FE detects an infrared signal within an acceptable bandwidth.

If both the FE and the hardware logic are constantly held active, the IrDA Control Dangle is rendered to the active mode after the detected infrared signal is analyzed and confirmed that it is a signal for the IrDA Control Dangle.

In either case, it becomes possible to detect an external infrared signal at any time, and also, a cycle management of the intermittent operation becomes unnecessary. In addition, if both the FE and the hardware logic are held in the active mode, fewer malfunctions will be expected than in the case where only the FE is held active.

As explained above, according to the IrDA Control Dangle of the present embodiment, the FE, or both the FE and the hardware logic, are constantly held in the active mode. Thus, the infrared signal can be detected at any time, whereby the operability of the user is improved.

Sixth Embodiment

The first through fifth embodiments are applied to the case where the IrDA Control Dangle causes the host device in the sleep mode to shift to the active mode when an external infrared signal is detected. In such a case, however, there is a possibility that the current consumed by the IrDA Control Dangle may exceed the average standby current of 2.5 mA before the host device enters the active mode.

In the present embodiment, instead of the IrDA Control Dangle as a whole, only the USB microcomputer unit 3 necessary for the control of the host device is made to enter the active mode, with the other circuits within the IrDA Control Dangle being remained in the sleep mode. Thus, it becomes possible to. decrease the average current consumption.

The IrDA Control Dangle is made to fully attain the active mode only after the host device attains the active mode and a sufficient current is supplied to the IrDA Control Dangle.

Thus, it is possible to maintain the current consumed by the IrDA Control Dangle not greater than 2.5 mA until the host device attains the active mode.

As explained above, according to the IrDA Control Dangle of the present embodiment, only the USB microcomputer unit 3 is made to enter the active mode before the host device attains the active mode, such that the average current consumption is reduced. Therefore, it is possible to prevent the current consumed by the IrDA Control Dangle from exceeding the average standby current, whereby malfunction can be avoided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A peripheral device, operating with power supplied from a host device comprising:

a receive unit receiving an external signal; and a controller causing at least one function of said peripheral device to operate intermittently when said host device is in a sleep mode, and, upon reception of the external signal via said receive unit, forcing said host device to shift to an active mode based on the signal received, wherein said controller includes a microcomputer and a hardware logic controlling said receive unit, and wherein said microcomputer causes at least one of said receive unit and said hardware logic to operate intermittently.

2. A peripheral device, operating with power supplied from a host device comprising:

a receive unit receiving an external signal;

a controller causing at least one function of said peripheral device to operate intermittently when said host device is in a sleep mode, and, upon reception of the external signal via said receive unit, forcing said host device to shift to an active mode based on the signal received;

a transmit unit externally transmitting a signal, wherein said transmit unit and said receive unit constitute a transceiver; and a USB interface, wherein said controller includes, a microcomputer generally controlling said peripheral device, a hardware logic controlling said transceiver, a USB transceiver communicating with said USB interface, and a USB peripheral controlling said USB transceiver.

3. A peripheral device operating with power supplied from a host device, comprising:

a receive unit receiving an external signal;

a controller causing at least one function of said peripheral device to operate intermittently when said host device is in a sleep mode, and, upon reception of the external signal via said receive unit, forcing said host device to shift to an active mode based on the signal received; and a timer, wherein said controller causes at least one function of said peripheral device to operate intermittently based upon an output signal of said timer.

4. The peripheral device according to claim 3, further comprising:

a transmit unit externally transmitting a signal, wherein said transmit unit and said receive unit constitute a transceiver; and a USB interface, wherein said controller includes, a microcomputer generally controlling said peripheral device, a hardware logic controlling said transceiver, a USB transceiver communicating with said USB interface, and a USB controlling said USB transceiver.

5. The peripheral device of claim 3, wherein the receive unit and controller operate intermittently at a prescribed frequency.

6. A peripheral device operating with power supplied from a host device comprising:

a receive unit receiving an external signal;

a controller causing at least one function of said peripheral device to operate intermittently when said host device is in a sleep mode, and, upon reception of the external signal via said receive unit, forcing said host device to shift to an active mode based on the signal received; and a transmit unit externally transmitting a signal, wherein said controller causes said transmit unit and a transmittable function of said controller to maintain a sleep mode when said host device is in a sleep mode.

7. The peripheral device according to claim 6, further comprising a USB interface, wherein said transmit unit and said receive unit constitute a transceiver, and wherein said controller includes, a microcomputer generally controlling said peripheral device, a hardware logic controlling said transceiver, a USB transceiver communicating with said USB interface, and a USB peripheral controlling said USB transceiver.

8. The peripheral device according to claim 6, wherein said controller causes at least one function of said peripheral device to be held in a sleep mode to attain an active mode after forcing said host device to shift to an active mode based on said signal received.

9. A control method of a peripheral device operating with power supplied from a host device, comprising the steps of:

causing at least one function of said peripheral device to operate intermittently when said host device is in a sleep mode;

receiving an external signal; and forcing said host device to shift to an active mode based on said external signal received, wherein said peripheral device at least includes, a receive unit receiving an external signal and a hardware logic controlling said receive unit, and wherein said step of causing at least one function of said peripheral device to operate intermittently includes the step of causing at least one of said receive unit and said hardware logic to operate intermittently.

10. A control method of a peripheral device operating with power supplied from a host device, comprising the steps of:

causing at least one function of said peripheral device to operate intermittently when said host device is in a sleep mode;

receiving an external signal; and forcing said host device to shift to an active mode based on said external signal received, wherein said peripheral device at least includes, a receive unit receiving an external signal and a controller generally controlling said peripheral device, and wherein said step of causing at least one function of said peripheral device to operate intermittently includes the step of causing at least one of said receive unit and said controller to operate intermittently.

11. A control method of a peripheral device operating with power supplied from a host device, comprising the steps of:

causing at least one function of said peripheral device to operate intermittently when said host device is in a sleep mode;

receiving an external signal; and forcing said host device to shift to an active mode based on said external signal received, wherein said peripheral device at least includes, a transmit unit externally transmitting a signal and a hardware logic controlling said transmit unit, and wherein said step of causing at least one function of said peripheral device to operate intermittently includes the step of causing said transmit unit and said hardware logic to maintain sleep mode when said host device is in a sleep mode.

* * * * *